(12) United States Patent
Kondo et al.

(10) Patent No.: US 8,812,222 B2
(45) Date of Patent: Aug. 19, 2014

(54) APPARATUS FOR STARTING ENGINE AND METHOD OF CONTROLLING ENGINE

(75) Inventors: Yumi Kondo, Aichi-gun (JP); Yuuya Yoshitomi, Aichi-gun (JP); Toshihiro Kawai, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/702,848

(22) PCT Filed: Sep. 29, 2011

(86) PCT No.: PCT/JP2011/072343
§ 371 (c)(1),
(2), (4) Date: Dec. 7, 2012

(87) PCT Pub. No.: WO2013/046387
PCT Pub. Date: Apr. 4, 2013

(65) Prior Publication Data
US 2013/0325304 A1  Dec. 5, 2013

(51) Int. Cl.
*F02D 29/02* (2006.01)

(52) U.S. Cl.
USPC ................................ 701/113; 123/179.1

(58) Field of Classification Search
USPC ............... 701/101, 102, 107, 112–114; 123/179.1, 179.4, 179.25, 198 D, 123/198 DB, 198 DC, 198 F, 339.1, 339.14, 123/339.15, 339.25; 290/38 B, 38 C, 38 E, 290/38 R
See application file for complete search history.

(56) References Cited

U.S. PATENT DOCUMENTS

| 5,555,872 A * | 9/1996 | Takeuchi et al. ............... 123/497 |
| 7,665,438 B2 * | 2/2010 | Hirning et al. ............. 123/179.3 |

(Continued)

FOREIGN PATENT DOCUMENTS

| JP | 2002-115578 | 4/2002 |
| JP | 2005-330813 | 12/2005 |

(Continued)

OTHER PUBLICATIONS

International Search Report Issued Nov. 8, 2011 in PCT/JP11/72343 Filed Sep. 29, 2011.

(Continued)

*Primary Examiner* — John Kwon
*Assistant Examiner* — Johnny H Hoang
(74) *Attorney, Agent, or Firm* — Oblon, Spivak, McClelland, Maier & Neustadt, L.L.P.

(57) ABSTRACT

A starter includes a pinion gear that can be engaged with a ring gear coupled to a crank shaft of an engine, an actuator that moves the pinion gear to a position where the pinion gear is engaged with a ring gear, and a motor that rotates the pinion gear. An ECU stops the engine when a predetermined stop condition is satisfied, and cranks the engine with a motor when a predetermined start condition is satisfied after the engine is stopped. The motor and the actuator are supplied with electric power from a battery. The ECU includes a mode in which the motor is driven prior to driving of the actuator. The ECU restricts a stop of the engine if, of a decreased voltage of the battery after driving the motor and a decreased voltage of the battery after driving the actuator, the lower voltage falls below a threshold value.

4 Claims, 7 Drawing Sheets

(56) References Cited

U.S. PATENT DOCUMENTS

| | | | |
|---|---|---|---|
| 2007/0225882 A1 | 9/2007 | Yamaguchi et al. | |
| 2008/0258472 A1* | 10/2008 | Mottier | 290/38 D |
| 2008/0264374 A1* | 10/2008 | Harris | 123/179.3 |
| 2009/0020091 A1* | 1/2009 | Botzenhard et al. | 123/179.3 |
| 2010/0059007 A1 | 3/2010 | Senda et al. | |
| 2010/0083926 A1* | 4/2010 | Okumoto et al. | 123/179.4 |
| 2010/0242905 A1* | 9/2010 | Machida et al. | 123/339.14 |
| 2010/0264765 A1 | 10/2010 | Haruno et al. | |
| 2010/0282199 A1* | 11/2010 | Heyers et al. | 123/179.3 |
| 2011/0004396 A1 | 1/2011 | Yamaguchi | |
| 2011/0095852 A1 | 4/2011 | Niimi et al. | |
| 2011/0132308 A1* | 6/2011 | Liu et al. | 123/179.4 |
| 2011/0202264 A1* | 8/2011 | Sengebusch | 701/113 |
| 2011/0218729 A1* | 9/2011 | Takahashi | 701/113 |
| 2013/0118431 A1* | 5/2013 | Moriya et al. | 123/179.3 |

FOREIGN PATENT DOCUMENTS

| | | |
|---|---|---|
| JP | 2008 19726 | 1/2008 |
| JP | 2010 84754 | 4/2010 |
| JP | 2010 255464 | 11/2010 |
| JP | 2011 12594 | 1/2011 |
| JP | 2011-94503 | 5/2011 |
| JP | 2011-96549 | 5/2011 |
| JP | 2011 169308 | 9/2011 |

OTHER PUBLICATIONS

Office Action issued Aug. 21, 2012 in Japanese Patent Application No. 2012-525358 (w/English language translation).

* cited by examiner

APPARATUS FOR STARTING ENGINE AND METHOD OF CONTROLLING ENGINE

TECHNICAL FIELD

The present invention relates to an apparatus for starting an engine and a method of controlling an engine, and more particularly to a technique for restricting idling stop or economy running of an engine.

BACKGROUND ART

In automobiles having internal combustion engines or the like as engines, so-called an idling-stop or economy-running function is installed, in which, for the purpose of fuel reduction or exhaust emission reduction, an engine is automatically stopped in a state in which a vehicle is stopped and a braked pedal is operated by the driver, and in addition, the engine is automatically restarted by the user's restarting operation, for example, by reducing the operating amount of the brake pedal to zero.

In the vehicle having the idling-stop or economy-running function, when the engine is stopped and thereafter restarted, a voltage of a battery that supplies electric power to a starter may decrease due to driving of the starter. When the voltage of the battery decrease, a memory of an ECU (Electronic Control Unit) may be reset.

Then, as described in Japanese Patent Laying-Open No. 2010-255464 (PTL 1), it is proposed to stop an internal combustion engine if an estimated lowest voltage of a battery when the internal combustion engine is restarted after being stopped is higher than a prescribed value. As shown in the paragraph 35 and FIG. 2 in Japanese Patent Laying-Open No. 2010-255464, the lowest voltage is estimated by subtracting a voltage drop due to starting the motor from the voltage immediately before restarting the engine.

CITATION LIST

Patent Literature

PTL 1: Japanese Patent Laying-Open No. 2010-255464

SUMMARY OF INVENTION

Technical Problem

There is proposed a starter configured to be able to drive an actuator for engaging a pinion gear with a ring gear of a flywheel (or drive plate), and a motor for rotating the pinion gear, independently. In such a starter, the motor is driven prior to driving of the actuator, whereby the pinion gear can be engaged with the ring gear after the rotational speed of the pinion gear of the starter is synchronized with the ring gear rotational speed of the flywheel (or drive plate). Therefore, the pinion gear can be engaged with the ring gear before the rotational speed of the output shaft (crank shaft) of the engine becomes zero. Thus, the engine can be cranked earlier.

When the motor is driven prior to driving of the actuator, the load on the motor is small because the engine is not cranked immediately after driving of the motor. Therefore, the amount of voltage drop of the battery immediately after driving of the motor may be small. However, in actuality, even if the voltage of the battery is insufficient, it is likely that it is determined that idling stop can be executed. Therefore, it is preferable that whether to execute idling stop should be determined based on the voltage after driving of the actuator, that is, the voltage during cranking of the engine, rather than the voltage of the battery immediately after driving of the motor.

However, if the output shaft rotational speed of the engine is high, or if a reduction ratio of the output shaft rotational speed is small, the load on the motor when the engine is cranked by bringing the pinion gear into engagement with the ring gear may be small. In this case, for example, even if the voltage immediately after driving of the motor falls below a threshold value, it is possible that the voltage after driving of the actuator does not fall below the threshold value. Therefore, idling stop may be executed although the voltage of the battery is actually insufficient.

The present invention is to restrict a stop of the engine when the voltage of the battery is insufficient.

Solution to Problem

In an embodiment, an apparatus for starting an engine that automatically stops based on a predetermined condition includes a starter that starts the engine, a battery that supplies electric power to the starter, and a control device for the starter. The starter includes a second gear that can be engaged with a first gear coupled to a crank shaft of the engine, an actuator that moves, in a driving state, the second gear to a position where the second gear is engaged with the first gear, and a motor that rotates the second gear. The control device can drive each of the actuator and the motor individually, has a rotation mode in which the motor is driven prior to driving of the actuator, and restricts an automatic stop of the engine based on a lower voltage of a decreased voltage of the battery driving the motor and a decreased voltage of the battery after driving the actuator when the rotation mode is executed.

With this configuration, even when a voltage drop amount after driving the motor is small, if a voltage drop amount after driving the actuator is large, an automatic stop of the engine can be restricted. Conversely, even when a voltage drop amount after driving the actuator is small, if a voltage drop amount after driving the motor is large, an automatic stop of the engine can be restricted. Therefore, when the voltage of the battery is insufficient, an automatic stop of the engine can be restricted without overlooking any voltage drop.

In another embodiment, the control device further has an engagement mode in which the actuator is driven to bring the second gear into engagement with the first gear prior to driving of the motor. When the engagement mode is executed, an automatic stop of the engine is restricted based on a decreased voltage after driving the motor.

With this configuration, for example, when an output shaft rotational speed of the engine is low, the second gear is engaged with the first gear before the second gear rotates, because synchronization between the first gear and the second gear is not necessary. After the second gear is engaged with the first gear, the second gear rotates and the engine is cranked. In this case, the voltage after driving of the motor may be lower than the voltage after driving of the actuator. Therefore, without monitoring the voltage before driving the motor, if the decreased voltage of the battery after driving the motor falls below a threshold value, a stop of the engine is restricted. Thus, when the voltage of the battery is insufficient, a stop of the engine can be restricted.

In a further embodiment, an engine automatically stops based on a predetermined condition. The engine is provided with a starter including a second gear that can be engaged with a first gear coupled to a crank shaft, an actuator that moves in a driving state, the second gear to a position where the second gear is engaged with the first gear, and a motor that rotates the second gear. The starter is supplied with electric power from a battery. A method of controlling the engine includes the steps of: driving the motor prior to driving of the actuator; and restricting an automatic stop of the engine based on a lower voltage of a decreased voltage of the battery after driving the motor and a decreased voltage of the battery after driving the actuator.

With this configuration, even when a voltage drop amount after driving the motor is small, if a voltage drop amount after driving the actuator is large, an automatic stop of the engine can be restricted. Conversely, even when a voltage drop amount after driving the actuator is small, if a voltage drop amount after driving the motor is large, an automatic stop of the engine can be restricted. Therefore, when the voltage of the battery is insufficient, an automatic stop of the engine can be restricted without overlooking any voltage drop.

Advantageous Effects of Invention

Even when a voltage drop amount after driving the motor is small, if a voltage drop amount after driving the actuator is large, an automatic stop of the engine can be restricted. Conversely, even when a voltage drop amount after driving the actuator is small, if a voltage drop amount after driving the motor is large, an automatic stop of the engine can be restricted. Therefore, when the voltage of the battery is insufficient, an automatic stop of the engine can be restricted without overlooking any voltage drop.

DESCRIPTION OF EMBODIMENTS

In the following, an embodiment of the present invention will be described with reference to the figures. In the following description, the same parts are denoted with the same reference signs. Their names and functions are also the same. Therefore, a detailed description thereof will not be repeated.

Figure 1:
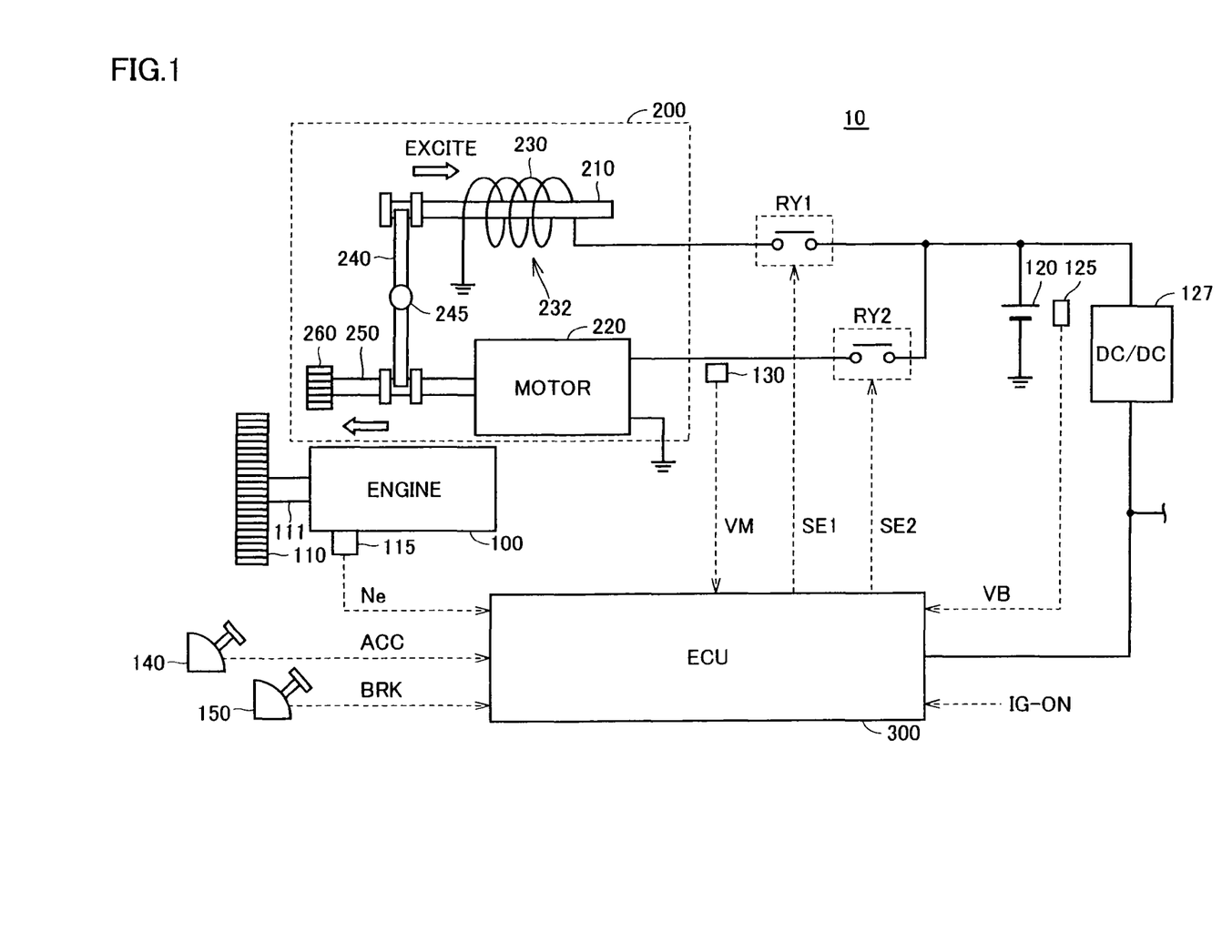
FIG. 1 is a general block diagram of a vehicle.

FIG. 1 is a general block diagram of a vehicle 10. Referring to FIG. 1, vehicle 10 includes an engine 100, a battery 120, a starter 200, an ECU 300, and relays RY1 and RY2. Starter 200 includes a plunger 210, a motor 220, a solenoid 230, a coupling unit 240, an output member 250, and a pinion gear 260.

Engine 100 generates a driving force for running vehicle 10. A crank shaft 111 of engine 100 is connected to driving wheels through a power transmission configured to include a clutch, a speed reducer, and the like.

Engine 100 is provided with a rotational speed sensor 115. Rotational speed sensor 115 detects a rotational speed Ne of engine 100 and outputs the detection result to ECU 300.

Battery 120 is an electric power storing element that is configured to be capable of charging and discharging. Battery 120 is configured to include a secondary battery such as a lithium-ion battery, a nickel metal hydride battery, or a lead-acid battery. Battery 120 may be configured with a power storage element such as an electric double-layer capacitor.

Battery 120 is connected to stator 200 through relay RY1, RY2 controlled by ECU 300. Battery 120 then supplies a power supply voltage for driving to stator 200 when relay RY1, RY2 is closed. The negative electrode of battery 120 is connected to a body ground of vehicle 10.

Battery 120 is provided with a voltage sensor 125. Voltage sensor 125 detects an output voltage VB of battery 120 and outputs the detected value to ECU 300.

The voltage of battery 120 is supplied to ECU 300 and auxiliary equipment such as an inverter of an air conditioner through a DC/DC converter 127.

One end of relay RY1 is connected to the positive electrode of battery 120 and the other end of relay RY1 is connected to one end of a solenoid 230 in stator 200. Relay RY1 is controlled by a control signal SE1 from ECU 300 and switches supply and cut-off of the power supply voltage from battery 120 to solenoid 230.

One end of relay RY2 is connected to the positive electrode of battery 120 and the other end of relay RY2 is connected to motor 220 in starter 200. Relay RY2 is controlled by a control signal SE2 from ECU 300 and switches supply and cut-off of the power supply voltage from battery 120 to motor 220. A voltage sensor 130 is provided on a power line connecting relay RY2 and motor 220. Voltage sensor 130 detects a motor voltage VM and outputs the detected value to ECU 300.

As described above, supply of the power supply voltage to motor 220 and solenoid 230 in starter 200 can be independently controlled by relays RY1 and RY2.

Output member 250 is coupled to a rotational shaft of a rotor (not shown) in the motor, for example, through a straight spline. A pinion gear 260 is provided at output member 250 at an end opposite to motor 220. When relay RY2 is closed, the power supply voltage is supplied from battery 120, and motor 220 is rotated. Then, output member 250 transmits the rotational movement of the rotor to pinion gear 260 to rotate pinion gear 260.

The one end of solenoid 230 is connected to relay RY1 and the other end of solenoid 230 is connected to the body ground as described above. When relay RY1 is closed and solenoid 230 is excited, solenoid 230 sucks plunger 210 in the direction of the arrow. In other words, plunger 210 and solenoid 230 constitute an actuator 232.

Plunger 210 is coupled to output member 250 through coupling unit 240. Solenoid 230 is excited to cause plunger 210 to be sucked in the direction of the arrow. Thus, output member 250 is moved by coupling unit 240 having a support 245 fixed, from the standby position shown in FIG. 1 in a direction opposite to the operating direction of plunger 210, that is, a direction in which pinion gear 260 goes away from the body of motor 220. Plunger 210 is biased with a force in a direction opposite to the arrow in FIG. 1 by a not-shown spring mechanism and is returned to the standby position when solenoid 230 becomes not excited.

When output member 250 is moved in the axial direction by excitation of solenoid 230 in this manner, pinion gear 260 engages with a ring gear 110 provided on the outer periphery of the flywheel or drive plate attached to crank shaft 111 of engine 100. Then, pinion gear 260 rotatably operates in the state in which pinion gear 260 and ring gear 110 are in engagement, whereby engine 100 is cranked and engine 100 is started.

In this manner, in the present embodiment, actuator 232 that moves pinion gear 260 so as to engage with ring gear 110 provided on the outer periphery of the flywheel or drive plate of engine 100, and motor 220 that rotates pinion gear 260 are controlled individually.

Although not shown in FIG. 1, a one-way clutch may be provided between output member 250 and the rotor shaft of motor 220 so as to prevent the rotor of motor 220 from being rotated by the rotational movement of ring gear 110.

Actuator 232 in FIG. 1 is not limited to the mechanism as described above as long as it has a mechanism capable of transmitting the rotation of pinion gear 260 to ring gear 110 and switching the state in which pinion gear 260 and ring gear 110 are in engagement and the state in which they are not in engagement. For example, actuator 232 may have such a mechanism in that pinion gear 260 and ring gear 110 are brought into engagement by moving the shaft of output member 250 in the radial direction of pinion gear 260.

ECU 300 includes a CPU (Central Processing Unit), a memory, and an input/output buffer, which are not shown, to perform input of each sensor and output of a control command to each equipment. The control thereof is not limited to processing by software, and part of the control may be processed by constructing dedicated hardware (electronic circuit).

ECU 300 receives a signal ACC representing the operating amount of an accelerator pedal 140 from a sensor (not shown) provided for accelerator pedal 140. ECU 300 receives a signal BRK representing the operating amount of a brake pedal 150 from a sensor (not shown) provided for brake pedal 150. ECU 300 also receives a start operation signal IG-ON caused by ignition operation by the driver. ECU 300 generates a start request signal and a stop request signal for engine 100 based on those information and outputs control signals SE1 and SE2 in accordance therewith to control the operation of starter 200.

For example, when stop conditions that the vehicle is stopped, brake pedal 150 is operated by the driver, and a stop of engine 100 is not restricted (permitted) are satisfied, the stop request signal is generated, so that ECU 300 stops engine 100. That is, when the stop conditions are satisfied, fuel injection and combustion in engine 100 is stopped.

Thereafter, when a start condition that the operating amount of brake pedal 150 by the driver is zero is satisfied, the start request signal is generated, so that ECU 300 drives motor 220 to crank engine 100. In other cases, engine 100 may be cranked when accelerator pedal 140, a shift lever for selecting a transmission range or gear, or a switch for selecting a vehicle running mode (for example, power mode or eco-mode) is operated.

When the start condition of engine 100 is satisfied, ECU 300 controls actuator 232 and motor 220 in one of a first mode in which actuator 232 and motor 220 are controlled so that pinion gear 260 starts rotation after pinion gear 260 moves toward ring gear 110 and a second mode in which actuator 232 and motor 220 are controlled so that pinion gear 260 moves toward ring gear 110 after pinion gear 260 starts rotation.

As described later, ECU 300 controls actuator 232 and motor 220 in the first mode when engine rotational speed Ne is equal to or less than a predetermined first reference value α1. ECU 300 controls actuator 232 and motor 220 in the second mode when engine rotational speed Ne is greater than the first reference value α1.

Figure 2:
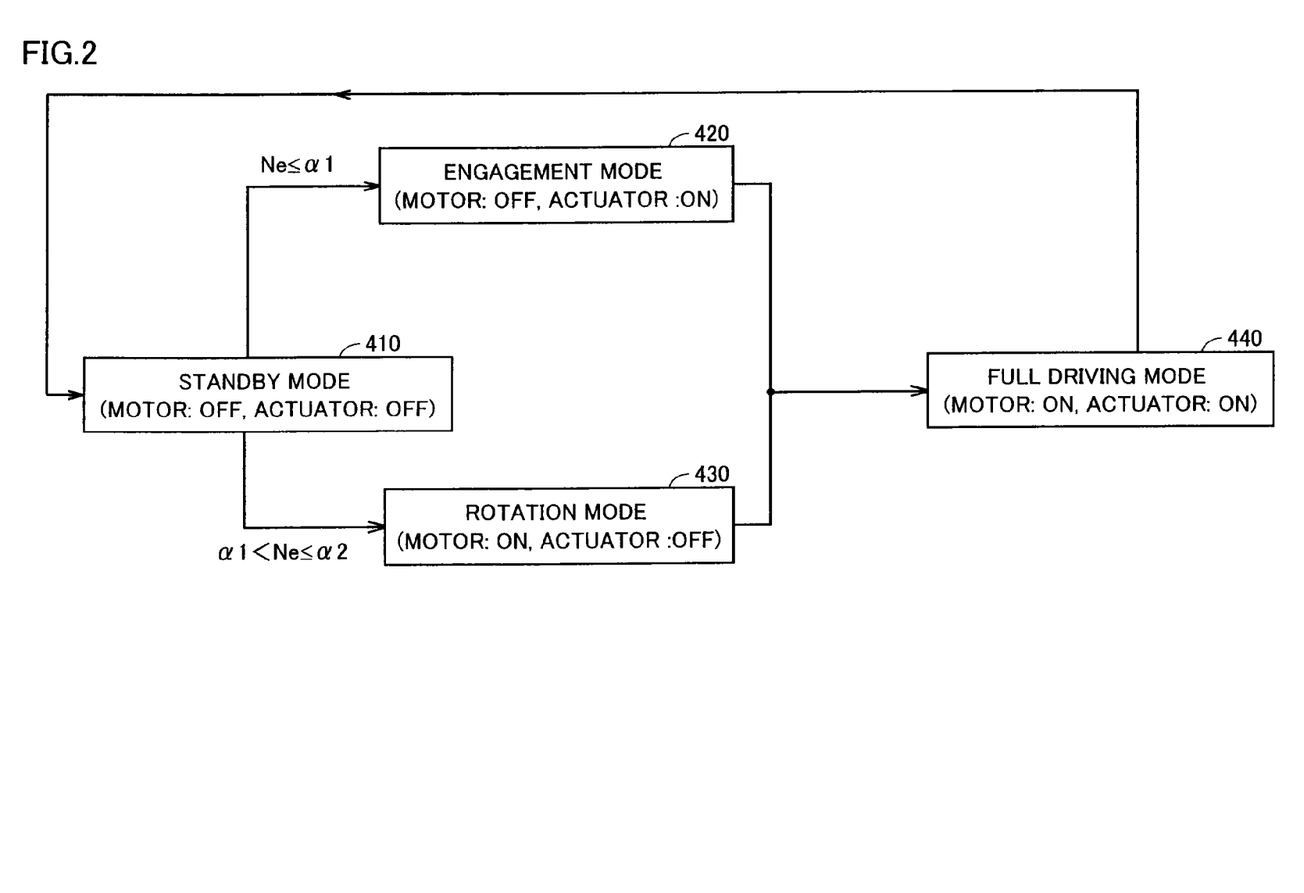
FIG. 2 is a diagram for explaining transition of operation modes of a starter.

FIG. 2 is a diagram for explaining transition of operation modes of starter 200 in the present embodiment. The operation modes of starter 200 in the present embodiment include a standby mode 410, an engagement mode 420, a rotation mode 430, and a full driving mode 440.

The first mode described above is a mode of shifting to full driving mode 440 through engagement mode 420. The second mode is a mode of shifting to full driving mode 440 through rotation mode 430.

Standby mode 410 represents a state in which neither actuator 232 nor motor 220 of starter 200 is driven, that is, a state in which the engine start request is not output to starter 200. Standby mode 410 corresponds to an initial state of starter 200 and is selected in a case where driving of starter 200 is unnecessary, for example, before the starting operation of engine 100, after starting of engine 100 is completed, and when starting of engine 100 is failed.

Full driving mode 440 represents a state in which both actuator 232 and motor 220 of starter 200 are driven. In this full driving mode 440, pinion gear 260 is rotated by motor 220 in the state in which pinion gear 260 and ring gear 110 are in engagement. Thus, engine 100 is actually cranked, and the starting operation is started.

Starter 200 in the present embodiment can drive each of actuator 232 and motor 220 independently as described above. Therefore, in a process of transition from standby mode 410 to full driving mode 440, there exist a case where actuator 232 is driven prior to driving of motor 220 (that is, corresponding to engagement mode 420) and a case where motor 220 is driven prior to driving of actuator 232 (that is, corresponding to rotation mode 430).

Selection between engagement mode 420 and rotation mode 430 is basically made based on rotational speed Ne of engine 100 when a request to restart engine 100 is produced.

Engagement mode 420 is a state in which only actuator 232 is driven and motor 220 is not driven. This mode is selected when pinion gear 260 and ring gear 110 can be engaged with each other even in a state in which pinion gear 260 is stopped. Specifically, this engagement mode 420 is selected in a state in which engine 100 is stopped or in a state in which rotational speed Ne of engine 100 is sufficiently reduced (Ne≤the first reference value α1).

On the other hand, rotation mode 430 is a state in which only motor 220 is driven and actuator 232 is not driven. This mode is selected, for example, when rotational speed Ne of engine 100 is relatively high (α1<Ne≤a second reference value α2) as in a case where a request to restart engine 100 is output immediately after a request to stop engine 100.

In this manner, when rotational speed Ne of engine 100 is high, the speed difference between pinion gear 260 and ring gear 110 is large with pinion gear 260 kept being stopped, so that the engagement between pinion gear 260 and ring gear 110 may be difficult. Therefore, in rotation mode 430, only motor 220 is driven prior to driving of actuator 232, and the rotational speed of ring gear 110 and the rotational speed of pinion gear 260 are brought into synchronization with each other. Then, in response to the difference between the rotational speed of ring gear 110 and the rotational speed of pinion gear 260 being sufficiently reduced, actuator 232 is driven to bring ring gear 110 and pinion gear 260 into engagement with each other. Then, the operation mode shifts from rotation mode 430 to full driving mode 440.

In the case of full driving mode 440, in response to completion of starting of engine 100 and start of self-sustaining operation of engine 100, the operation mode is returned from full driving mode 440 to standby mode 410.

In this manner, when the request signal to start engine 100 is output, that is, when it is determined that engine 100 is to be started, actuator 232 and motor 220 are controlled in one of the first mode of shifting to full driving mode 440 through engagement mode 420 and the second mode of shifting to full driving mode 440 through rotation mode 430.

Figure 3:
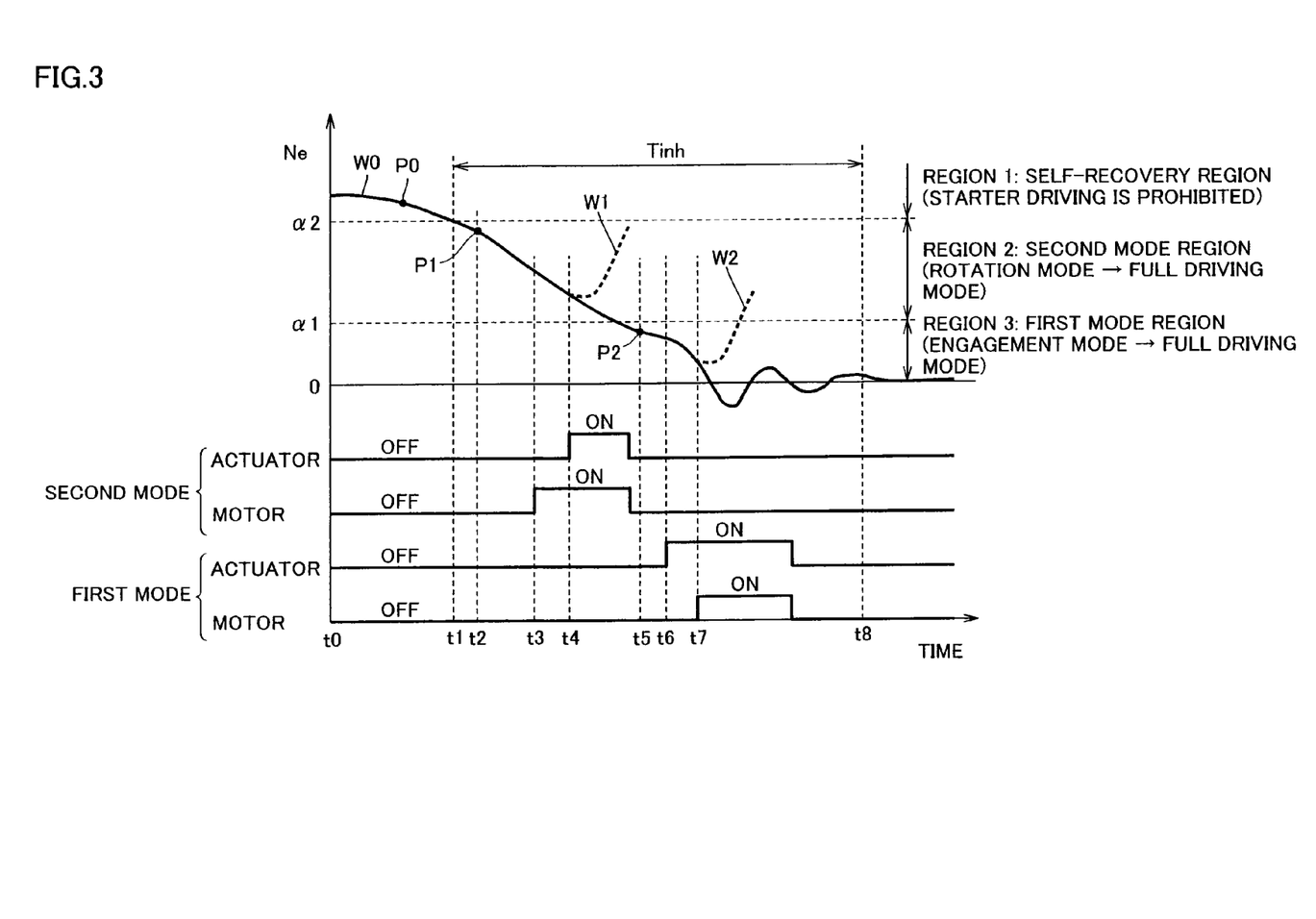
FIG. 3 is a diagram for explaining driving modes during an engine starting operation.

FIG. 3 is a diagram for explaining two driving modes (the first mode, the second mode) during an engine starting operation in the present embodiment.

In FIG. 3, the horizontal axis shows time, and the vertical axis shows rotational speed Ne of engine 100, and the driving states of actuator 232 and motor 220 during the first mode and during the second mode.

It is assumed that at time t0, for example, the stop conditions that the vehicle is stopped and brake pedal 150 is operated by the driver are satisfied, whereby a request to stop engine 100 is generated, and engine 100 is stopped (fuel injection and ignition is stopped). In this case, unless engine 100 is restarted, rotational speed Ne of engine 100 gradually decreases, and the rotation of engine 100 is finally stopped, as indicated by a solid curve W0.

Next, it is assumed that while rotational speed Ne of engine 100 is decreasing, for example, the start condition that the operating amount of brake pedal 150 by the driver becomes zero is satisfied, whereby a request to restart engine 100 is generated. This case is classified into three regions depending on rotational speed Ne of engine 100.

The first region (Region 1) is a case where rotational speed Ne of engine 100 is higher than the second reference value $\alpha 2$ and is, for example, a state in which the start condition is satisfied at a point P0 in FIG. 3 and a restart request is generated.

Region 1 is a region where rotational speed Ne of engine 100 is high enough so that engine 100 can be started through the fuel injection and ignition operation even without using starter 200. In other words, it is a region in which engine 100 can recover by itself. Therefore, in Region 1, driving of starter 200 is restricted, more specifically, prohibited. It is noted that the second reference value $\alpha 2$ above may be limited by the maximum rotational speed of motor 220.

The second region (Region 2) is a case where rotational speed Ne of engine 100 is between the first reference value $\alpha 1$ and the second reference value $\alpha 2$ and is a state in which the start condition is satisfied at a point P1 in FIG. 3 and a restart request is generated.

Region 2 is a region in which engine 100 cannot recover by itself but rotational speed Ne of engine 100 is relatively high. In this region, the rotation mode is selected as described in FIG. 2.

At time t2, when a request to restart engine 100 is generated, first, motor 220 is driven after a prescribed time has passed. Thus, pinion gear 260 starts rotating. Then, at time t4, actuator 232 is driven. Then, when ring gear 110 and pinion gear 260 are brought into engagement, engine 100 is cranked, and rotational speed Ne of engine 100 increases as indicated by a broken curve W1. Thereafter, when engine 100 resumes self-sustaining operation, driving of actuator 232 and motor 220 is stopped.

The third region (Region 3) is a case where rotational speed Ne of engine 100 is lower than the first reference value $\alpha 1$ and is, for example, a state in which the start condition is satisfied at a point P2 in FIG. 3 and a restart request is generated.

Region 3 is a region where rotational speed Ne of engine 100 is low and pinion gear 260 and ring gear 110 can be engaged with each other even without synchronizing pinion gear 260. In this region, the engagement mode is selected as described in FIG. 2.

At time t5, when a request to restart engine 100 is generated, first, actuator 232 is driven after a prescribed time has passed. Thus, pinion gear 260 is pushed toward ring gear 110. Thereafter, motor 220 is driven (time t7 in FIG. 3). Thus, engine 100 is cranked, and rotational speed Ne of engine 100 increases as indicated by a broken curve W2. Thereafter, when engine 100 resumes self-sustaining operation, driving of actuator 232 and motor 220 is stopped.

In this manner, restart control of engine 100 is performed using starter 200 capable of driving actuator 232 and motor 220 independently, so that engine 100 can be restarted for a shorter time than with a conventional starter in which a restart operation of engine 100 is prohibited during a period (Tinh) from the rotational speed at which self-recovery of engine 100 is disabled (time t1 in FIG. 3) to the stop of engine 100 (time t8 in FIG. 3). Accordingly, the driver's uncomfortable feeling caused by a delay in engine restart can be reduced.

Figure 4:
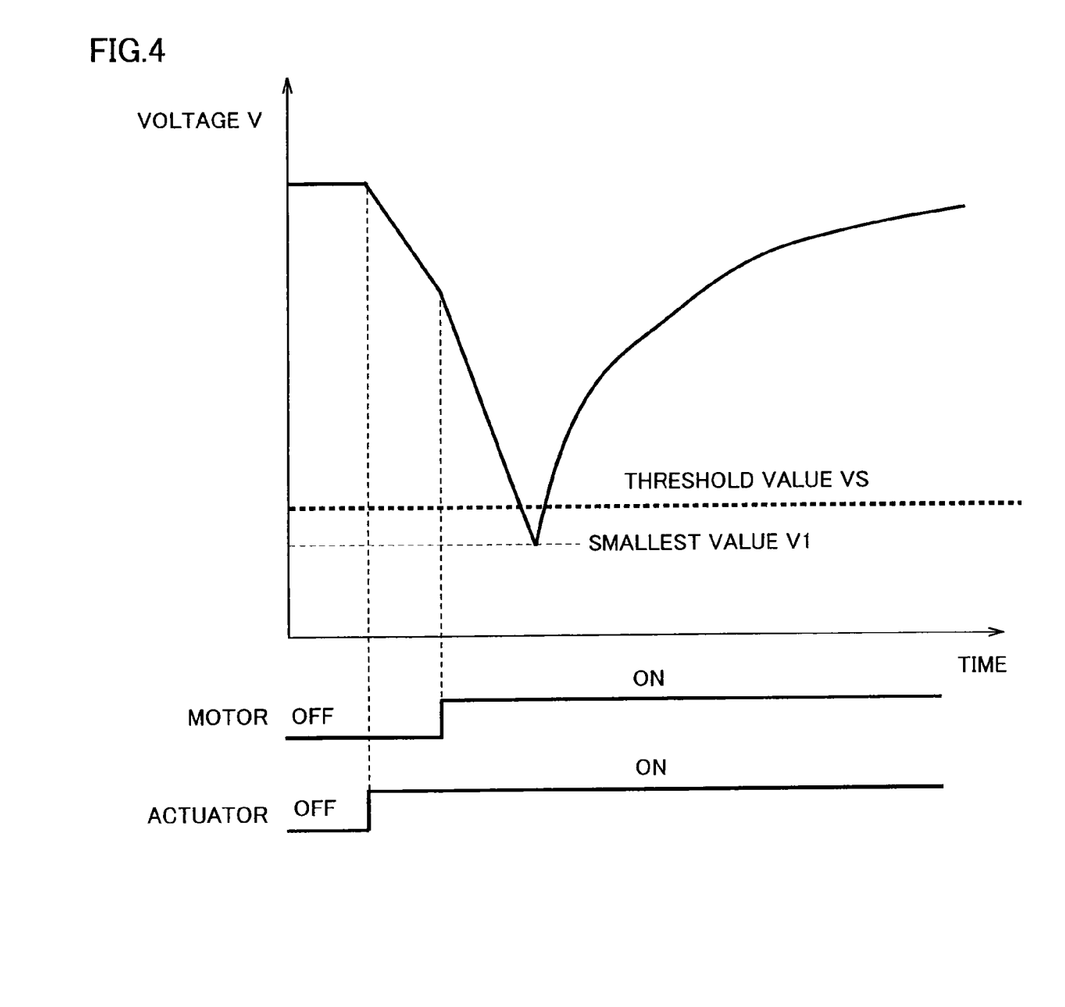
FIG. 4 is a diagram showing voltage of a battery in a first mode.

As shown in FIG. 4, when engine 100 is restarted in the first mode, the load on motor 220 suddenly increases. Therefore, the voltage of battery 120 for supplying electric power to motor 220 and actuator 232 may be significantly reduced temporarily after motor 220 is driven. A voltage drop of battery 120 is undesirable because battery 120 supplies electric power not only to motor 220 but also to auxiliary equipment.

Then, in the present embodiment, when engine 100 is restarted in the first mode, if the decreased voltage of battery 120 after motor 220 is driven falls below a threshold value VS, a stop of engine 100 is thereafter restricted. More specifically, an automatic stop of engine 100, i.e., idling stop or economy running, is prohibited. Alternatively, the frequency of automatically stopping engine 100 may be reduced. For example, when the lowest value V1 of the voltage of battery 120 during driving of motor 220 is equal to or less than threshold value VS, it is determined that the voltage of battery 120 falls below threshold value VS.

When engine 100 is restarted in the first mode, the voltage after driving of motor 220 may be lower than the voltage after driving of actuator 232. Therefore, without monitoring the voltage before driving motor 220, if the voltage of battery 120 that is decreased after driving motor 220 falls below threshold value VS, a stop of engine 100 is restricted. Therefore, when the voltage of battery 100 is insufficient, an automatic stop of engine 100 can be restricted.

Figure 5:
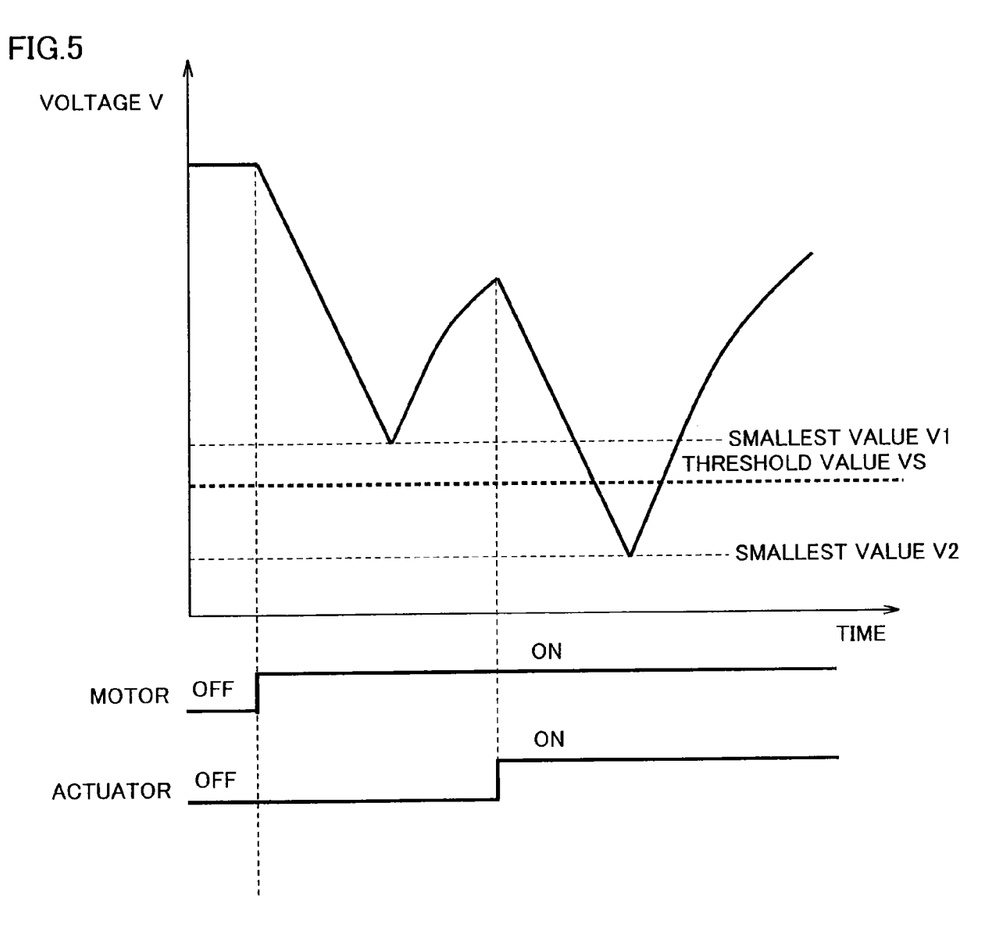
FIG. 5 is a diagram showing voltage of the battery in a second mode.

Similarly, as shown in FIG. 5, when engine 100 is restarted in the second mode, after motor 220 is driven and, in addition, after actuator 232 is driven to start cranking, the voltage of battery 120 may be significantly reduced temporarily because of a sudden increase of load on motor 220.

When engine 100 is restarted in the second mode, if, of the decreased voltage of battery 120 after driving motor 220 and the decreased voltage of battery 120 after driving actuator 232, the lower voltage falls below threshold value VS, a stop of engine 100 is thereafter restricted. For example, if, of the lowest value V1 of voltage of battery 120 in a period after driving motor 220 and before driving actuator 232 and the lowest value V2 of voltage of battery 120 in a period after driving actuator 232, the lower voltage is equal to or less than threshold value VS, a stop of engine 100 is thereafter restricted.

Accordingly, even when a voltage drop amount after driving motor 220 is small, if a voltage drop amount after driving actuator 232 is large, an automatic stop of engine 100 can be restricted. Conversely, even when a voltage drop amount after driving actuator 232 is small, if a voltage drop amount after driving motor 220 is large, an automatic stop of engine 100 can be restricted. Therefore, when the voltage of battery 120 is insufficient, an automatic stop of engine 100 can be restricted without overlooking any voltage drop.

Idling stop or economy running may be restricted until an IG-OFF signal is received next, or may be restricted until the memory of ECU 300 is reset due to replacement of battery 120.

Figure 6:
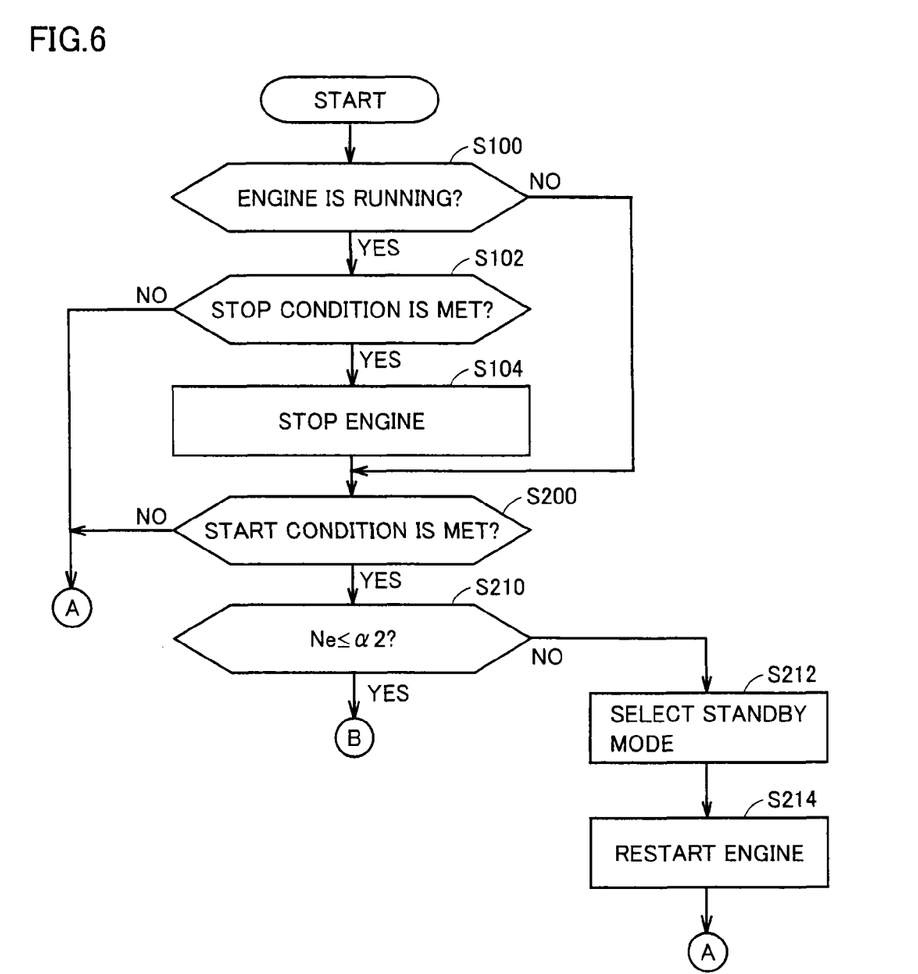
FIG. 6 is a first flowchart showing processes executed by an ECU.
Figure 7:
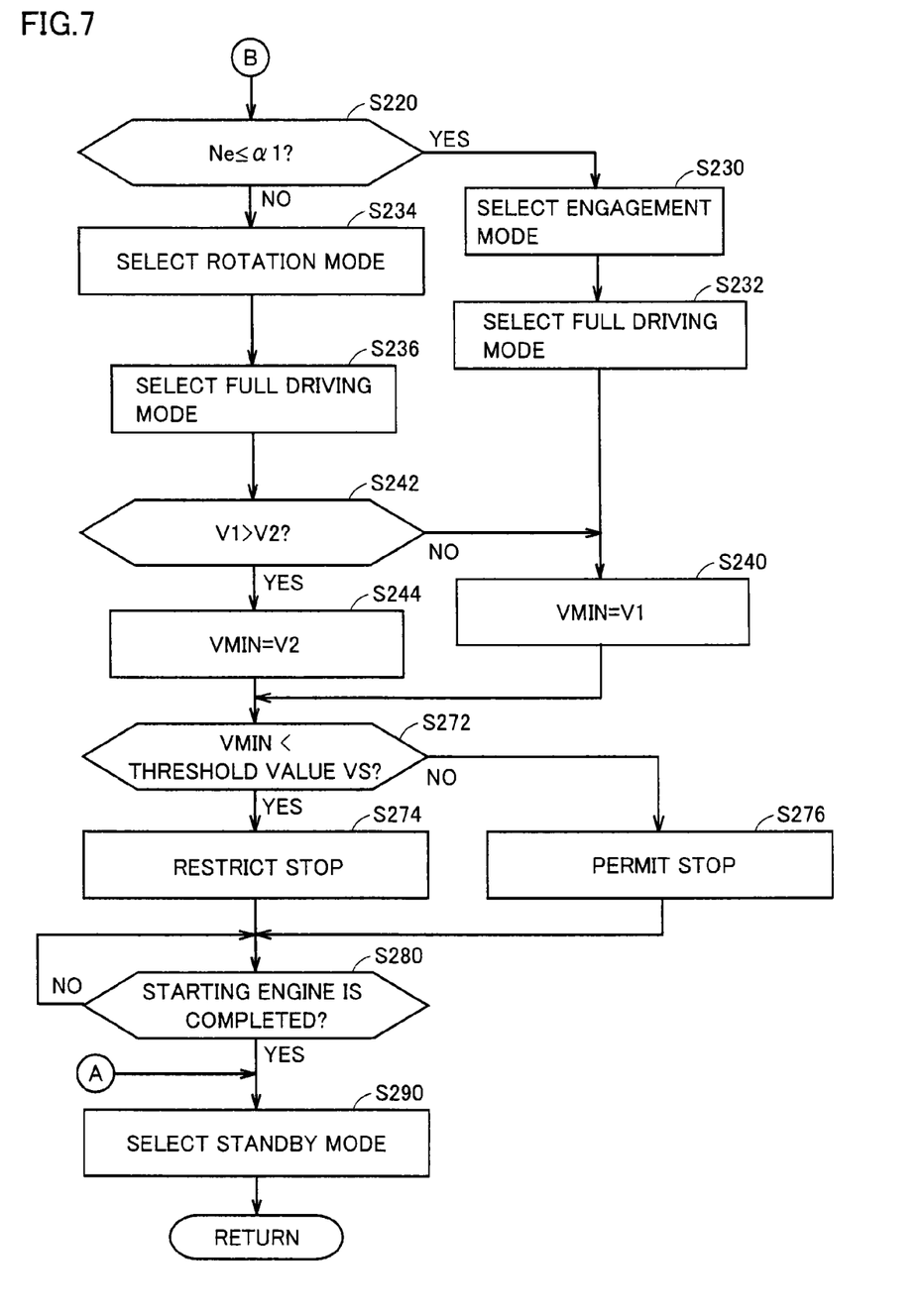
FIG. 7 is a second flowchart showing processes executed by the ECU.

Referring to FIG. 6 and FIG. 7, a process executed by ECU 300 for stopping and starting engine 100 will be described below. The flowcharts shown in FIG. 6 and FIG. 7 are implemented by executing a program prestored in ECU 300 at prescribed intervals. Alternatively, for part of the steps, the process can be implemented by constructing dedicated hardware (electronic circuit).

In step (step is hereinafter abbreviated as S) 100, ECU 300 determines whether engine 100 is running. If engine 100 is running (YES in S100), in S102, ECU 300 determines whether the stop condition of engine 100 is satisfied. That is, it is determined whether to stop engine 100.

If the stop condition of engine 100 is not satisfied (NO in S102), for example, because a stop of engine 100 is restricted, the operation of engine 100 is continued. In this case, the process proceeds to S290, and ECU 300 selects the standby mode as the operation mode of starter 200.

If the stop condition of engine 100 is satisfied (YES in S102) because a stop of engine 100 is not restricted, in S104, ECU 300 stops engine 100. Therefore, fuel injection and combustion in engine 100 is stopped.

Thereafter, in S200, ECU 300 determines whether the start condition of engine 100 is satisfied. That is, it is determined whether to start engine 100. If the start condition of engine 100 is not satisfied (NO in S200), the starting operation of engine 100 is unnecessary. Therefore, the process proceeds to S290 and ECU 300 selects the standby mode as the operation mode of starter 200.

If the start condition of engine 100 is satisfied (YES in S200), the process proceeds to S210. Then, ECU 300 determines whether rotational speed Ne of engine 100 is equal to or less then the second reference value $\alpha 2$.

If rotational speed Ne of engine 100 is greater than the second reference value $\alpha 2$ (NO in S210), engine rotational speed Ne corresponds to Region 1 in FIG. 3 in which self-recovery of engine 100 is possible. Therefore, ECU 300 proceeds to S212 and selects the standby mode. Thereafter, in S214, ECU 300 resumes fuel injection and combustion so as to restart engine 100.

If rotational speed Ne of engine 100 is equal to or less than the second reference value $\alpha 2$ (YES in S210), in S220, ECU 300 determines whether rotational speed Ne of engine 100 is equal to or less than the first reference value $\alpha 1$ ($0 < \alpha 1$).

If rotational speed Ne of engine 100 is equal to or less than the first reference value $\alpha 1$ (YES in S220), engine rotational speed Ne is included in Region 3 in FIG. 3. Therefore, the process proceeds to S230, and ECU 300 selects the engagement mode as the operation mode of starter 200. Then, ECU 300 outputs control signal SE1 to close relay RY1 thereby driving actuator 232. Here, motor 220 is not driven.

Thereafter, the process proceeds to S232, and ECU 300 selects the full driving mode as the operation mode of starter 200. Then, motor 220 is driven so as to crank engine 100.

In the case where actuator 232 is driven prior to motor 220, the voltage after driving motor 220 and starting cranking may be lower than the voltage after driving of actuator 232. Therefore, it is not necessary to monitor the voltage before driving motor 220. Thus, in 240, the smallest value V1 of decreased voltage of battery 120 after motor 220 is driven is set to the minimum value VMIN for determining whether to stop engine 100. If the minimum value VMIN falls below threshold value VS (YES in S272), in S274, ECU 300 restricts a stop of engine 100. Accordingly, when the voltage of battery 100 is insufficient, an automatic stop of engine 100 is restricted. When a stop of engine 100 is restricted, the stop condition is thereafter not satisfied. Therefore, an automatic stop of engine 100, that is, idling stop or economy running is restricted, and engine 100 continues to be operated.

If the minimum value VMIN does not fall below threshold value VS (NO in S272), in S276, ECU 300 permits a stop of engine 100.

Next, in S280, ECU 300 determines whether starting of engine 100 is completed. The determination as to whether starting of engine 100 is completed may be made by determining whether the engine rotational speed is greater than a threshold value $\gamma$ indicative of self-sustaining operation, after a prescribed time has passed since the start of driving motor 220.

If starting of engine 100 is not completed (NO in S280), cranking of engine 100 is continued.

If starting of engine 100 is completed (YES in S280), the process proceeds to S290, and ECU 300 selects the standby mode as the operation mode of starter 200.

If rotational speed Ne of engine 100 is greater than the first reference value $\alpha 1$ (NO in S220), in S234, ECU 300 selects the rotation mode as the operation mode of starter 200. Then, ECU 300 outputs control signal SE2 to close relay RY2 thereby driving motor 220. Here, actuator 232 is not driven.

Then, in S236, ECU 300 selects the full driving mode as the operation mode of starter 200. Accordingly, actuator 232 is driven to bring pinion gear 260 and ring gear 110 into engagement, so that engine 100 is cranked.

In general, power consumption of motor 220 is greater than that of other electrical equipment such as actuator 232. However, a voltage drop amount of battery 120 may be small irrespective of an insufficient voltage of battery 120 because the load on motor 220 is small before pinion gear 260 and ring gear 110 are engaged with each other. Conversely, when pinion gear 260 and ring gear 110 are in engagement, the load on motor 220 required for cranking may be small because the rotational speed of pinion gear 260 and the rotational speed of ring gear 110 are synchronized with each other. Also in this case, a voltage drop amount of battery 120 may be small irrespective of an insufficient voltage of battery 120.

Then, in the present embodiment, if the lowest value V1 of voltage of battery 120 in a period before driving actuator 232 is lower than the lowest value V2 of voltage of battery 120 in a period after driving actuator 232 (NO in S242), in S240, the smallest value V1 is set to the minimum value VMIN for determining whether to stop engine 100.

On the other hand, if the lowest value V2 of voltage of battery 120 in a period after driving actuator 232 is lower than the lowest value V1 of voltage of battery 120 in a period before driving actuator 232 (YES in S242), in S244, the smallest value V2 is set to the minimum value VMIN for determining whether to stop engine 100.

If the minimum value VMIN falls below threshold value VS (YES in S272), in S274, ECU 300 restricts a stop of engine 100. Therefore, even when a voltage drop amount after driving motor 220 is small, if a voltage drop amount after driving actuator 232 is large, an automatic stop of engine 100 can be restricted. Conversely, even when a voltage drop amount after driving actuator 232 is small, if a voltage drop amount after driving motor 220 is large, an automatic stop of engine 100 can be restricted.

If starting of engine 100 is completed (YES in S280), the process proceeds to S290, and ECU 300 selects the standby mode as the operation mode of starter 200.

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

DESCRIPTION OF THE REFERENCE SIGNS 10 vehicle, 100 engine, 110 ring gear, 111 crank shaft, 115 rotational speed sensor, 120 battery, 125, 130 voltage sensor, 140 accelerator pedal, 150 brake pedal, 160 power transmission, 170 driving wheel, 200, 202 starter, 210 plunger, 220 motor, 230 solenoid, 232 actuator, 240 coupling unit, 245 support, 250 output member, 260 pinion gear, 270 one-way clutch, 300 ECU, 410 standby mode, 420 engagement mode, 430 rotation mode, 440 full driving mode, RY1, RY2 relay.

The invention claimed is:

1. An apparatus for starting an engine that automatically stops based on a predetermined condition, comprising:
    a starter that starts said engine;
    a battery that supplies electric power to said starter; and
    a control device for controlling said starter,
    said starter including
        a second gear that can be engaged with a first gear coupled to a crank shaft of said engine,
        an actuator that moves, in a driving state, said second gear to a position where said second gear is engaged with said first gear, and
        a motor that rotates said second gear,
    wherein said control device
    can drive each of said actuator and said motor individually,
    has a rotation mode in which said motor is driven prior to driving of said actuator, and
    when said rotation mode is executed, restricts an automatic stop of said engine based on a lower voltage of a decreased voltage of said battery after driving said motor and a decreased voltage of said battery after driving said actuator.

2. The apparatus according to claim 1, wherein said control device
    further has an engagement mode in which said actuator is driven to bring said second gear into engagement with said first gear prior to driving of said motor, and
    when said engagement mode is executed, restricts an automatic stop of said engine based on a decreased voltage after driving said motor.

3. A method of controlling an engine that automatically stops based on a predetermined condition, said engine being provided with a starter including a second gear that can be engaged with a first gear coupled to a crank shaft, an actuator that moves, in a driving state, said second gear to a position where said second gear is engaged with said first gear, and a motor that rotates said second gear, said starter being supplied with electric power from a battery, said method comprising the steps of:
    driving said motor prior to driving of said actuator; and
    restricting an automatic stop of said engine based on a lower voltage of a decreased voltage of said battery after driving said motor and a decreased voltage of said battery after driving said actuator.

4. The apparatus according to claim 1, wherein when a lower voltage of a minimum voltage value of said battery after driving said motor and before driving said actuator and a minimum voltage value of said battery after driving said actuator in addition to driving said motor falls below a threshold value, said control device restricts an automatic stop of said engine.

* * * * *